T. UTLEY.
SHIP'S LIGHT.
APPLICATION FILED MAY 25, 1915.
1,364,465.
Patented Jan. 4, 1921.
3 SHEETS—SHEET 2.
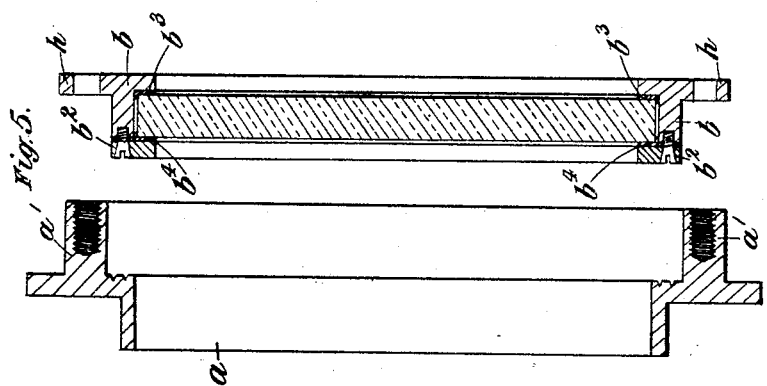
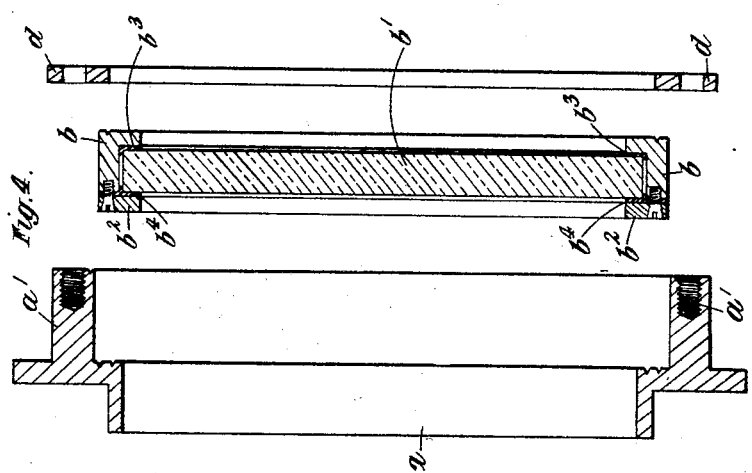

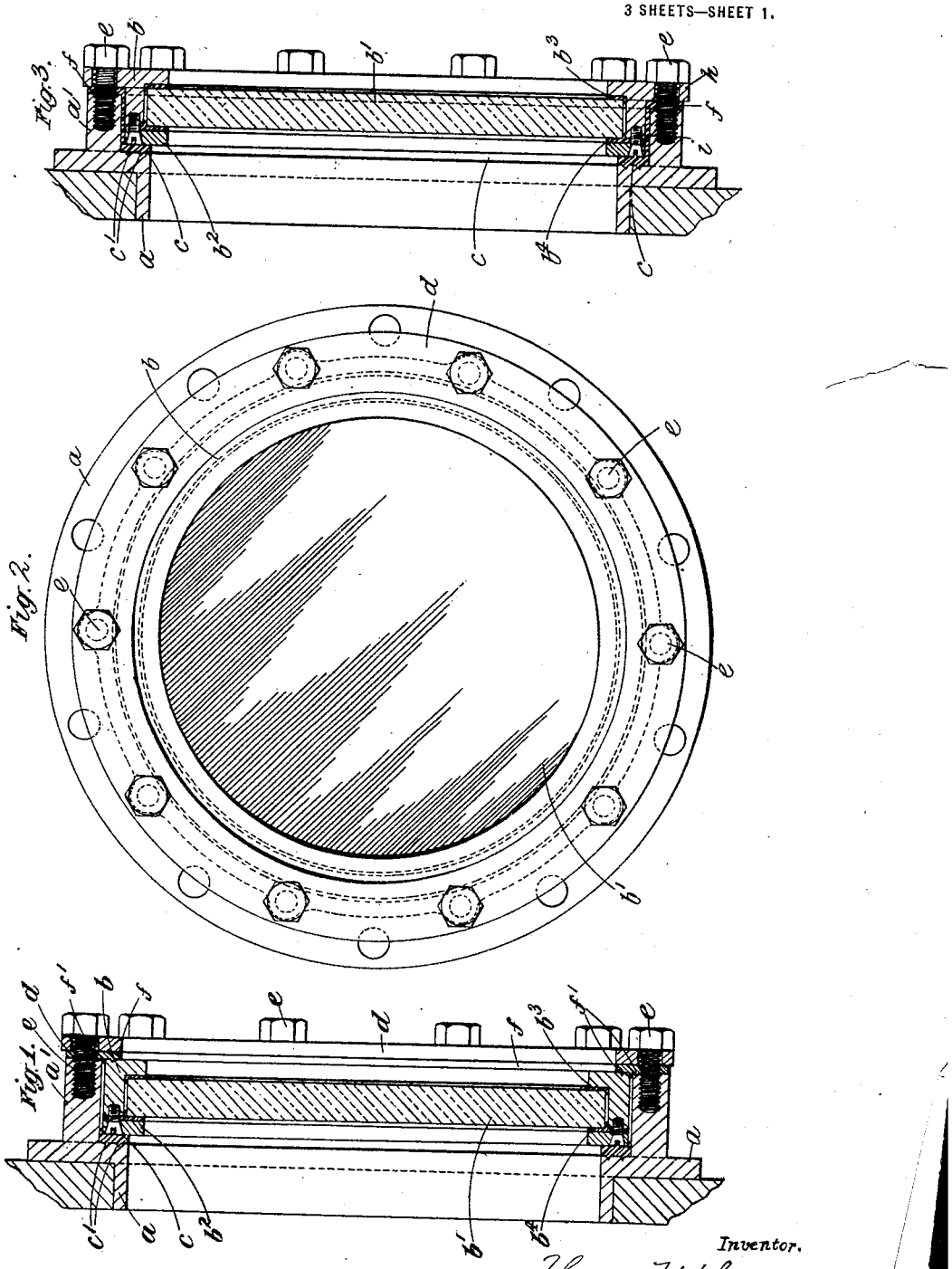

T. UTLEY.
SHIP'S LIGHT.
APPLICATION FILED MAY 25, 1915.
1,364,465.
Patented Jan. 4, 1921.
3 SHEETS—SHEET 3.
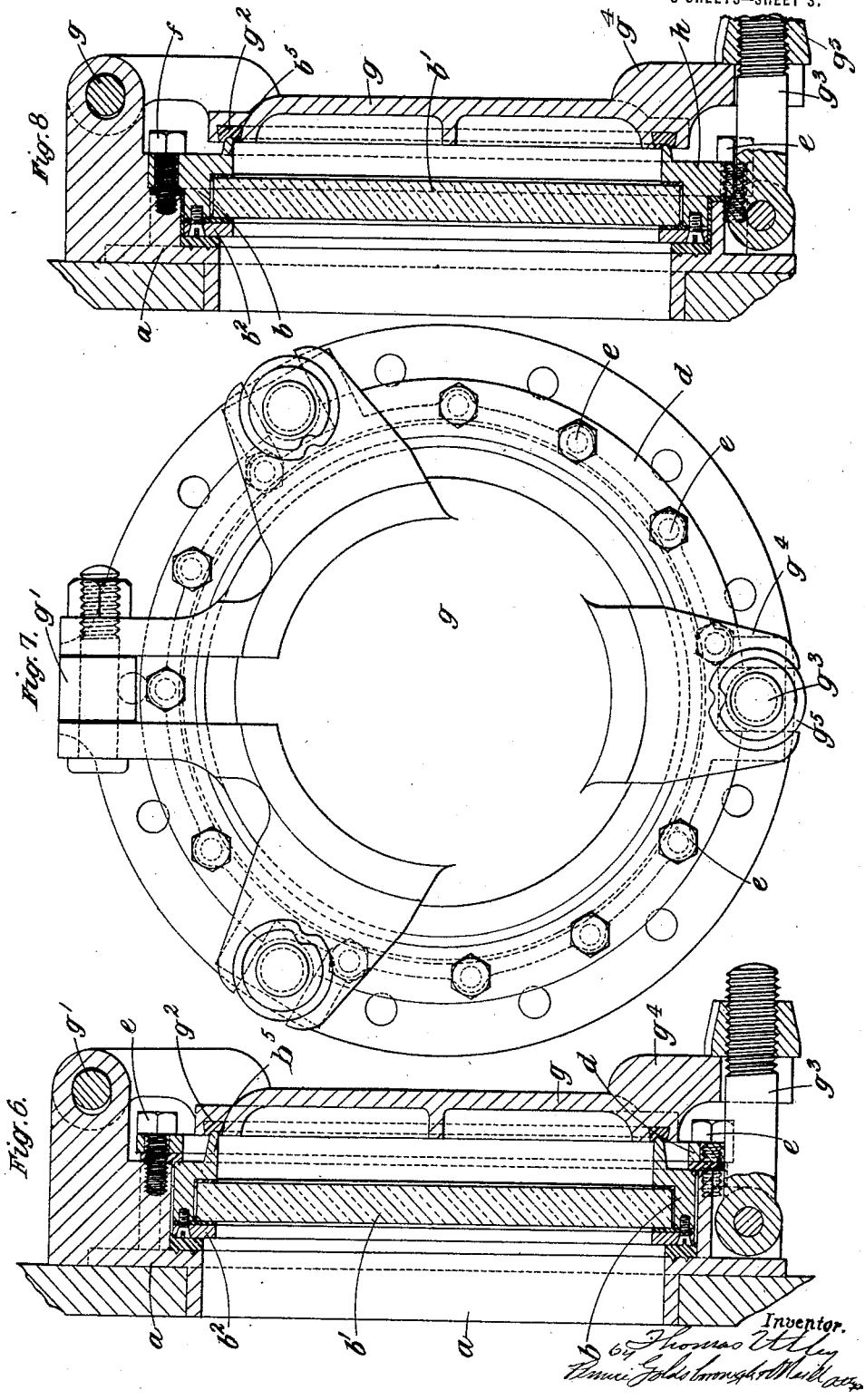

UNITED STATES PATENT OFFICE.

THOMAS UTLEY, OF LIVERPOOL, ENGLAND.

SHIP'S LIGHT.

1,364,465.  Specification of Letters Patent.  Patented Jan. 4, 1921.

Application filed May 25, 1915. Serial No. 30,475.

*To all whom it may concern:*

Be it known that I, THOMAS UTLEY, a subject of the King of Great Britain, residing at Sefton House, Crosby Green, West Derby, Liverpool, in the county of Lancaster, England, have invented certain new and useful Improvements in or Relating to Ships' Lights, of which the following is a specification.

This invention relates to ships' lights and has more particular reference to fixed lights which are usually secured in the lowest positions on the ship's hull. Fixed lights as at present constructed comprise a circular frame which is secured to the ship's side or hull and which also serves as the holder for the glass or light proper, the latter being retained in position by an externally screw threaded ring engaging with an internally screw threaded portion of the frame. This construction is open to the objection that a strain on the frame as a result of heavy seas for example will tend to distort the frame and thus fracture the glass or light and it is the chief object of the present invention to overcome this objection.

According to this invention the glass or light proper is contained in an independent or separate holder which can be secured or fixed in the frame in such a manner that the glass holder and the glass contained therein are practically immune from the strain or shock to which the frame may be subjected. The glass holder may be resiliently mounted in the frame by means of rubber rings or cushions against which the glass holder is held by suitable means to form water tight joints or connections, the said rings or cushions serving to absorb shocks and so prevents the glass-holder from being strained or distorted. The frame and the glass holder may be of the usual circular formation and the glass holder may be held in position in the frame by a separate retaining ring which is secured to the frame by a number of screws; or instead of employing a separate ring the glass holder may be provided with a flange or the equivalent which can be secured to the frame by screws.

In order that the said invention may be clearly understood and readily carried into effect the same will now be described more fully with reference to the accompanying drawings, in which:—

Figures 1 and 2 are respectively a sectional elevation and a front elevation of one construction of the improved light.

Fig. 3 is a similar view to Fig. 1, illustrating a slightly modified construction.

Figs. 4 and 5 are sectional elevations of the two modifications in Figs. 1 and 3 showing the glass-holder in each case detached from the frame.

Figs. 6 and 7 are similar views to Figs. 1 and 2 showing the improved light fitted with a cover or "dead light" and Fig. 8 is a similar view to Fig. 6 illustrating a slightly modified construction.

Throughout the aforesaid figures like letters of reference designate similar parts.

$a$ is the frame which as shown is of the usual circular formation and is secured in or around the aperture in the ship's hull in any conventional manner, and $b$ is the glass holder which as aforesaid is independent of or separate from the frame as clearly shown in Figs. 4 and 5.

The frame is provided with an annular flange $a'$ the diameter of which is larger than that of the circular opening in the frame to form an internal abutment, the said flange being adapted to receive the glass holder $b$. The glass holder is in the form of a ring of L-section in which the glass $b'$ is held by a flat retaining ring $b^2$ secured in position by a number of countersunk screws; suitable rubber packing rings $b^3$ $b^4$ are interposed between the glass holder $b$ and its retaining ring $b^2$. The glass holder fits easily within the said flange $a'$ so as to avoid the likelihood of the glass holder binding on the flange and the outer surface of the glass holder is prevented from coming into contact with the internal abutment on the frame $a$ by a rubber ring $c$ which as shown is formed with concentric annular projections $c'$ $c'$ to fit into concentric annular grooves or recesses in the frame. The said ring may in some cases be of larger cross section than shown in the drawings, and if desired may be dovetailed or otherwise fitted into the frame.

In the example shown in Figs. 1 and 6 the glass-holder is held in the frame by a separate retaining ring $d$ which is secured to the frame by a number of screws $e$, see Figs. 2 and 7. A rubber ring $f$ is securely held by the clamping ring $d$ against the flange $a'$ and the glass-holder, to cover the annular space between the said flange and the glass-holder, and the said rubber ring *f* may be provided with concentric projections *f' f'* fitting in annular grooves in the frame and the glass holder respectively.

By means of the two rubber rings *c* and *f* a proper watertight construction is provided and they also serve for absorbing any shock or strain to which the frame may be subjected, so as to prevent the glass holder from being strained or distorted.

A hinged cover or dead light *g* of usual construction may be hinged at *g'* to the frame *a* as shown in Figs. 6 and 7, and the glass holder *b* may be provided with an annular projection $b^5$ which becomes more or less embedded in the rubber ring $g^2$ when the cover is closed in the usual manner by means of the swing bolts $g^3$ hinged on the frame and engaging with forked lugs $g^4$ on the cover. The nuts $g^5$ on the swing bolts may be similar to those described in the specification of my prior Patent No. 1445 of 1914.

In the example shown in Figs. 3, 5 and 8 I dispense with the separate clamping ring as above described, and I provide a flange *h* on the glass holder (see especially Fig. 5) which flange when the glass holder is in position in the frame is so situated with respect to the frame flange *a'* that the glass holder flange *h* can be secured to the latter by a number of screws *e* to retain the glass holder in position. In this example a rubber ring *i* is placed in the annular space between the glass holder and the frame flange *a'* in addition to the rubber rings *c* and *f* see Figs. 3 and 8. The ring *i* is preferably made in one piece with the rings *c* and *f*; in some cases however the parts *c*, *f* and *i* may be made separate.

This modification may also be provided with a cover or dead light *g* which is constructed, arranged and operated in a similar manner to that shown in Fig. 6.

Although a separate or independent glass holder is provided it will be understood that the various modifications hereinbefore described constitute fixed lights in the ordinary meaning of the term, that is to say, the glass holder cannot be detached or removed from the frame except by unscrewing the various screws *e* hereinbefore referred to.

What I claim and desire to secure by Letters Patent of the United States is:—

1. A fixed or non-opening light for ships, comprising in combination, a frame adapted to be secured to the ship's side, a glass plate, a protecting ring around the peripheral edge of the plate adapted to be secured within and surrounded by said flame, means for retaining the protecting ring permanently in place in said frame, and a soft resilient substance interposed between the ring and frame and between the ring and ring-retaining means.

2. A fixed or non-opening light for ships, comprising in combination, a frame adapted to be secured to the ship's side, a glass plate, a protecting metal ring on the peripheral edge of said plate comprising a glass holder adapted to be secured within and surrounded by said frame, means secured to the frame for permanently retaining the glass holder therein, and a soft resilient substance interposed between said frame and glass holder and between said glass holder and glass holder retaining means.

3. A fixed or non-opening light for ships, comprising in combination, a circular frame adapted to be secured to the ship's hull, an annular flange on said frame, a circular glass holder adapted to fit within said flange so as to be surrounded thereby, a glass plate within said holder, means situated adjacent to and adapted to be secured to said flange to retain said glass holder permanently within said flange, and a soft resilient substance interposed between the frame and glass holder and between the glass holder and glass holder retaining means.

4. A fixed or non-opening light for ships, comprising in combination, a circular frame adapted to be secured to the ship's hull, an annular member comprising a glass holder with an internal abutment, a retaining ring adapted to be secured to said member or holder, a glass or light held between said internal abutment and said ring, means for permanently retaining said glass holder in position within said frame which surrounds the said glass holder, and a soft resilient substance interposed between the glass holder and the frame and between the glass holder and the holder retaining means.

5. A fixed or non-opening light for ships, comprising in combination, a circular frame secured to the ship's hull, having an annular flange and an internal annular abutment, a circular glass or light, an annular member comprising a holder for said glass having an internal abutment, a retaining ring to hold the glass in the annular member or holder against said abutment on said holder, rubber rings in said holder secured against the surfaces of the glass, annular retaining means to retain said glass holder permanently within the flange on the frame against the abutment on the latter so as to be surrounded by the frame, and rubber rings between said frame and glass holder and between the glass holder and glass holder retaining ring.

6. A fixed or non-opening light for ships, comprising in combination a circular frame adapted to be secured to the ship's hull, an annular flange and abutment on said frame, a circular glass holder adapted to fit within said flange so as to be closely surrounded thereby, retaining means situated adjacent to and adapted to be secured to said flange, a rubber ring of substantial section interposed between said abutment and glass holder and a rubber ring interposed between said retaining means and said flange and said glass holder.

7. A fixed or non-opening light for ships, comprising in combination, a circular frame adapted to be secured to the ship's side, a circular glass plate, a protecting metal ring on the peripheral edge of said plate comprising a glass holder adapted to be held within and surrounded by said frame, an annular projection on said glass holder, means for retaining said glass holder permanently in position, a soft resilient substance interposed between the frame and glass holder and between the glass holder and glass holder retaining means, a cover or deadlight hinged to the frame having a rubber ring embedded therein adapted to engage with said annular projection on the glass holder.

THOMAS UTLEY.